US009446586B2

(12) United States Patent  
Matos et al.

(10) Patent No.: US 9,446,586 B2
(45) Date of Patent: Sep. 20, 2016

(54) SYSTEMS AND METHODS FOR IMAGE DISTORTION REDUCTION IN WEB PRINTING

(71) Applicant: The Procter & Gamble Company, Cincinnati, OH (US)

(72) Inventors: Claudio Antonio Matos, Loveland, OH (US); David Christopher Oetjen, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/963,058

(22) Filed: Aug. 9, 2013

(65) Prior Publication Data

US 2015/0042714 A1    Feb. 12, 2015

(51) Int. Cl.
*B41J 15/00*    (2006.01)
*B41J 15/06*    (2006.01)
*B41J 2/07*    (2006.01)
(Continued)

(52) U.S. Cl.
CPC ............... *B41J 2/07* (2013.01); *B41J 11/008* (2013.01); *B41J 11/0025* (2013.01); *B41J 15/046* (2013.01); *H04N 1/387* (2013.01)

(58) Field of Classification Search
CPC ...... B41J 11/00; B41J 13/00; B41J 13/0027; B41J 15/00; B41J 15/06; B41J 15/046; B41J 25/308; B41J 25/3086; B41J 11/0025; B41J 11/008
USPC ....................................... 347/8, 19
See application file for complete search history.

(56) References Cited

U.S. PATENT DOCUMENTS 7,881,818 B2    2/2011   Van Bael et al.
8,256,859 B2    9/2012   Sirringhaus et al.
(Continued)

FOREIGN PATENT DOCUMENTS

| EP | 1467554 | 10/2004 |
| WO | WO2008087403 | 7/2008 |
| WO | WO2010049059 | 5/2010 |

OTHER PUBLICATIONS

27th International Conference on Digital Printing Technologies, NIP27 and 7th International Conference on Digital Fabrication 2011; Minneapolis, MN; United States; Oct. 2, 2011 through Oct. 6, 2011, Lee, H. Samsung Electronics, Suwon, Gyeonggi-Do, South Korea, pp. 229-232.

(Continued)

*Primary Examiner* — Geoffrey Mruk
*Assistant Examiner* — Scott A Richmond
(74) *Attorney, Agent, or Firm* — Andres E. Velarde

(57) ABSTRACT

Included are embodiments for image distortion reduction in web printing. Some embodiments are configured for determining an ink drop speed of ink from a printer and determining a web travel speed of a web of material, where the web of material engages with a folding board during printing that manipulates a plane of the web of material such that a projection of the web width is effectively reduced. Some embodiments may be configured for determining an altered web geometry of the web of material while engaging with the folding board, receiving a desired image for printing on the web of material, and calculating a pixel displacement of the plurality of pixels. Some embodiments may be configured for creating an altered image that utilizes the pixel displacement from the desired image and sending data related to the altered image for printing on the web of material.

7 Claims, 6 Drawing Sheets

(51) Int. Cl.
 *B41J 11/00* (2006.01)
 *B41J 15/04* (2006.01)
 *H04N 1/387* (2006.01)

(56) References Cited

U.S. PATENT DOCUMENTS

2002/0196298 A1 12/2002 Cheng et al.
2004/0109216 A1* 6/2004 Nakaya ................. B41J 25/003
 359/237
2005/0093899 A1* 5/2005 Kawamura .......... B41J 2/17526
 347/8
2007/0070107 A1* 3/2007 Shamoun ............... B41J 29/393
 347/14
2009/0033716 A1* 2/2009 Karrer .................... B41J 15/046
 347/40
2011/0063355 A1 3/2011 Eun et al.
2012/0113176 A1 5/2012 Folkins et al.

OTHER PUBLICATIONS

PCT International Search Report, mailed Feb. 20, 2015, 9 pages.

* cited by examiner

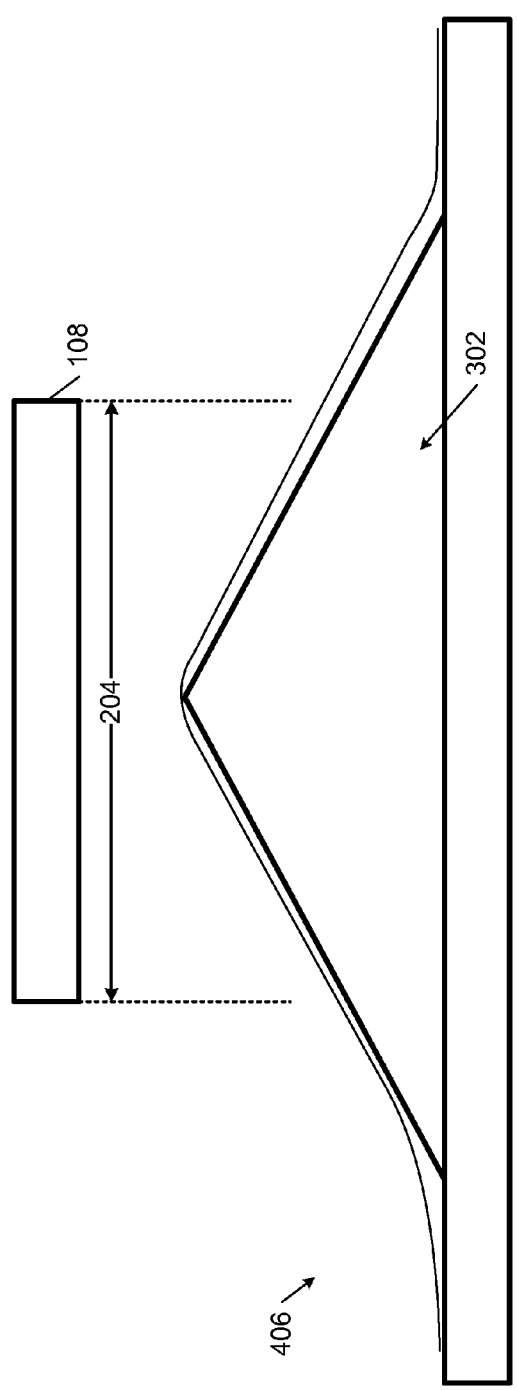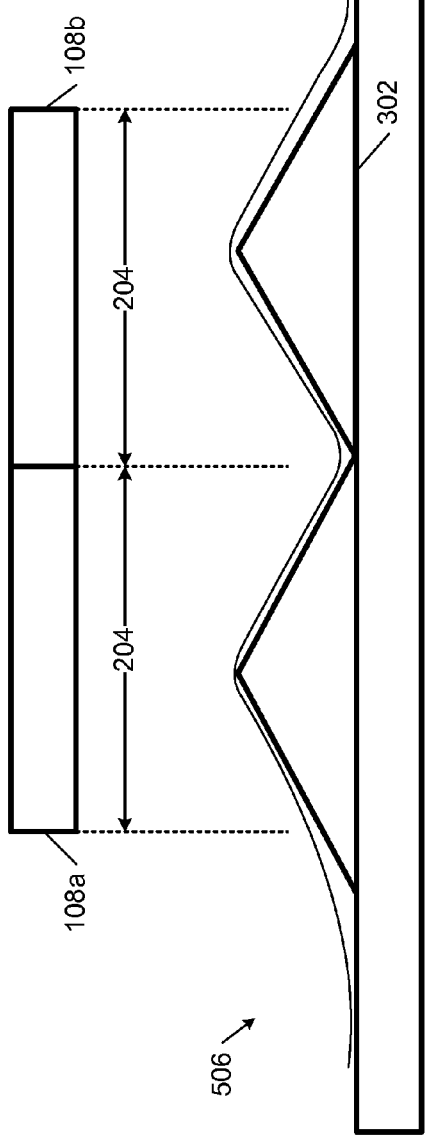

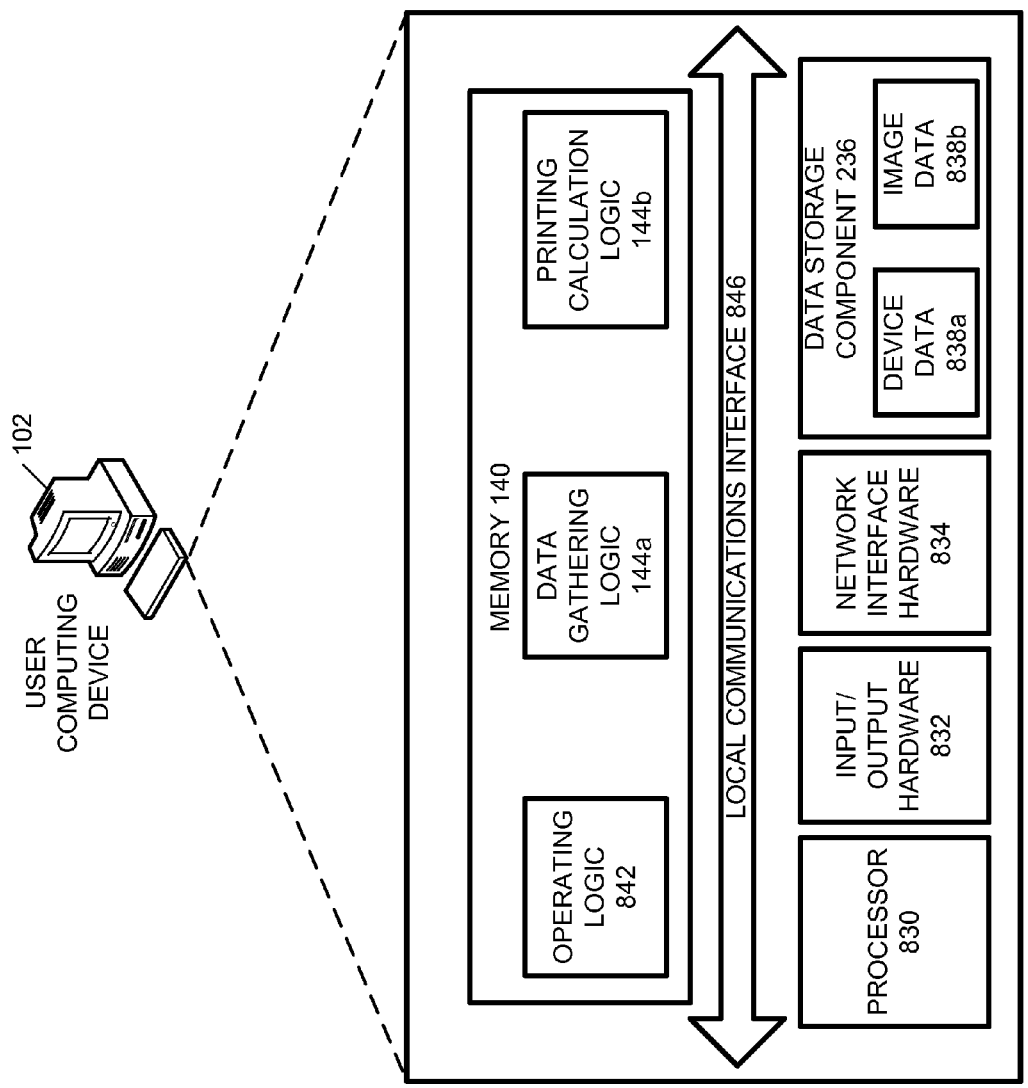

SYSTEMS AND METHODS FOR IMAGE DISTORTION REDUCTION IN WEB PRINTING

FIELD OF THE INVENTION

The present application relates generally to systems and methods for image distortion reduction in web printing and specifically to altering image data sent to a printer to compensate for alterations in an altered plane of a web of material.

BACKGROUND OF THE INVENTION

Printing for web-based products often includes a moving web of material, such as paper, plastic, or similar materials in a machine direction and printing on a surface of the web of material, as the web passes within range of a printer. While such a mechanism may provide adequate printing of small imagery, oftentimes, the desired imagery exceeds a width that the printer can print. When this occurs, manufacturers often are required to design and/or purchase new manufacturing equipment, add another printer, replace the current printer, and/or perform other costly expenditures.

SUMMARY OF THE INVENTION

Included are embodiments for image distortion reduction in web printing. Some embodiments are configured for determining an ink drop speed of a printer and determining a web travel speed of a web of material, where the web of material engages with a folding board during printing that manipulates a plane of the web of material such that a projection of the web width is effectively reduced. Some embodiments may be configured for determining an altered web geometry of the web of material while engaging with the folding board, receiving a desired image for printing on the web of material, and calculating a pixel displacement of the plurality of pixels. Some embodiments may be configured for creating an altered image that utilizes the pixel displacement from the desired image and sending data related to the altered image for printing on the web of material.

Also included are embodiments of a system. Some embodiments of the system include a folding board, a printer, and a computing device that stores logic that, when executed by a processor, causes the system to determine the ink drop speed, the web travel speed, and the altered web geometry, receive a desired image for printing on the moving web of material at the printing area, wherein the desired image includes a pixel, and calculate, from the ink drop speed, the web travel speed, and the altered web geometry, a pixel displacement of the pixel in the cross machine direction and machine direction that will accurately print the desired image in the printing area while the folding board is receiving the printing area. In some embodiments, the logic causes the system to create an altered image that utilizes the pixel displacement from the desired image and send data related to the altered image to the printer for printing.

Also included are embodiments of a non-transitory computer-readable medium. Some embodiments of the non-transitory computer-readable medium include logic that causes a computing device to determine a web travel speed of a web of material, where the web of material engages with a folding board during printing that manipulates a plane of the web of material to such that a projection of the web width is effectively reduced. The logic may also cause the computing device to determine an altered web geometry of the web of material while engaging with the folding board, receive a desired image for printing on the web of material, and calculate an image change to the desired image that will allow accurate printing of the desired image on the web of material at the folding board. In some embodiments the logic causes the computing device to create an altered image that incorporates the image change from the desired image, wherein the altered image is an altered version of the desired image such that printing produces the desired image, when the web of material is removed from the folding board and send data related to the altered image to the printer for printing on the web of material.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

FIG. 4 depicts a cross-sectional view of a folding board and a web of material, according to embodiments disclosed herein;

FIG. 5 depicts a cross-sectional view of a dual folding board, utilizing a plurality of printers, according to embodiments disclosed herein;

FIG. 8 depicts a user computing device that may be utilized for image distortion reduction in web printing, according to embodiments disclosed herein.

DETAILED DESCRIPTION OF THE INVENTION

Embodiments disclosed herein include systems and methods for image distortion reduction in web printing. Specifically, embodiments disclosed herein may be utilized to overcome print width constraints when printing on a web of material. As discussed above, many printing issues occur where the image has a greater width than the maximum printing width of the printer. Accordingly, embodiments disclosed herein may use a folding board of a predetermined shape, which manipulates the web of material such that a starting web width is effectively reduced by manipulating a plane of the moving web of material to create an altered geometry. The web of material may generally traverse the web printing device in a planar fashion, with the folding board manipulating the web of material such that the web of material is brought out from the web plane in a direction that is substantially perpendicular to the plane of the web of material (e.g., perpendicular to both the machine direction and the cross-machine direction). A printer may thus print at the folding board, thereby increasing the effective printing width of the printer.

While such a configuration allows the printer to print at a width that is greater than when printing on a planar surface, distortion may occur in that the printer may now be printing at an angle that is different than substantially perpendicular to the web of material. Accordingly, embodiments described herein may be configured to determine a characteristic of the web of material, a characteristic of the folding board, and/or other characteristics and may then determine an altered image that will yield the desired image when printing at the folding board. Other embodiments are also disclosed herein.

Figure 1:
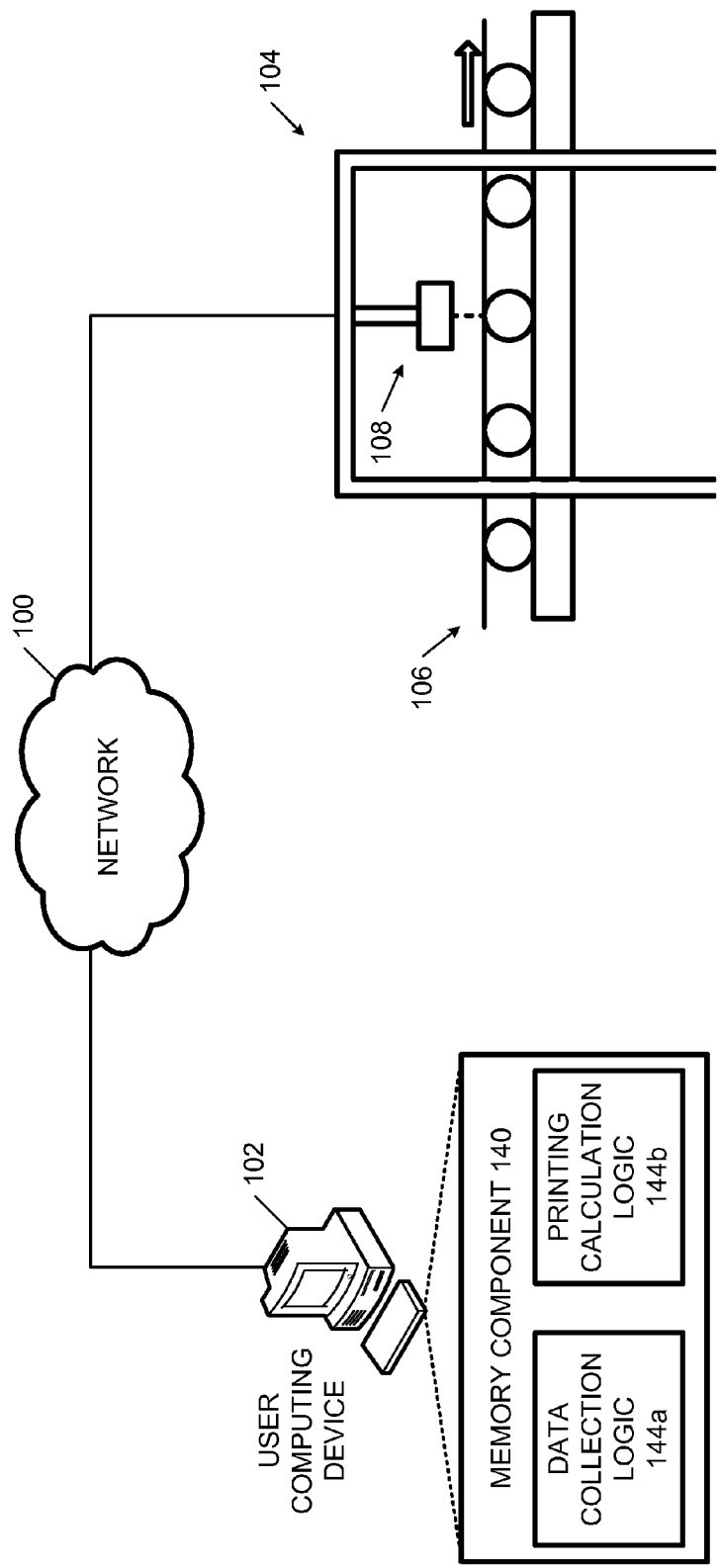
FIG. 1 depicts a web printing environment for image distortion reduction in web printing, according to embodiments disclosed herein.

Referring now to the drawings, FIG. 1 depicts a web printing environment for image distortion reduction, according to embodiments disclosed herein. As illustrated, a network 100 is coupled to a user computing device 102 and a web printing device 104. The user computing device 102 may include a memory component 140 that stores data gathering logic 144a and printing calculation logic 144b. As described in more detail below, the data gathering logic 144a may cause the user computing device 102 (when executed by a processor) to determine the parameters described below. These parameters may be determined via a user input, a sensor input, and/or via other mechanisms. Additionally, the printing calculation logic 144b may cause the user computing device 102 to perform one or more calculations for determining the altered image for printing at the folding board.

The web printing device 104 may include a web of material 106 (also referred to as the "moving web of material"), which travels in the machine direction (depicted with an arrow), as well as a printer 108. The printer 108 may include any type of printer, such as an inkjet, laser printer, etc., so long as the printer 108 is configured for and/or capable of printing on the web of material 106. The printer 108 may also include logic and/or may otherwise be configured for communicating with the user computing device 102, such as via a computing device on the web printing device 104. Regardless of the mechanism, the user computing device 102 may receive information from the web printing device 104 to determine ink speed, web speed, accuracy of a print, and/or other information described below.

Figure 2:
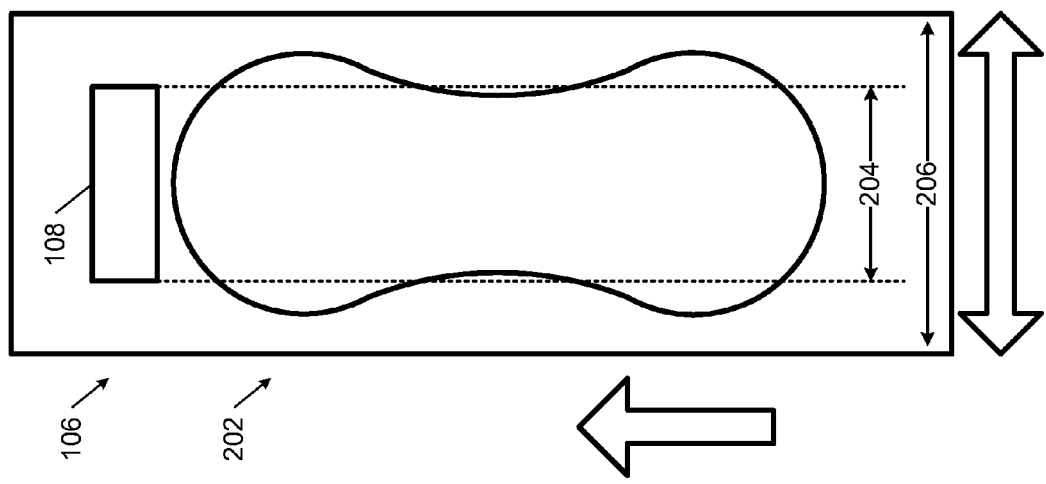
FIG. 2 depicts an overhead view of a web of material, a desired image, and a printer width, according to embodiments disclosed herein.

FIG. 2 depicts an overhead view of a web of material 106, a desired image 202, and a printing width 204, according to embodiments disclosed herein. As illustrated, the printer 108 may be instructed to print a desired image 202 on the moving web of material 106 with a starting web width 206. However, the printer 108 may have a printing width 204 that is less than the width of the desired image. As a consequence, many current solutions are generally unable to print the image desired 202 because the printing width 204 is less than the image width. However, embodiments disclosed herein may utilize a folding board to manipulate a plane of the moving web of material 106 such that a projection of the starting web width 206 is effectively reduced by to create an altered geometry.

Figure 3:
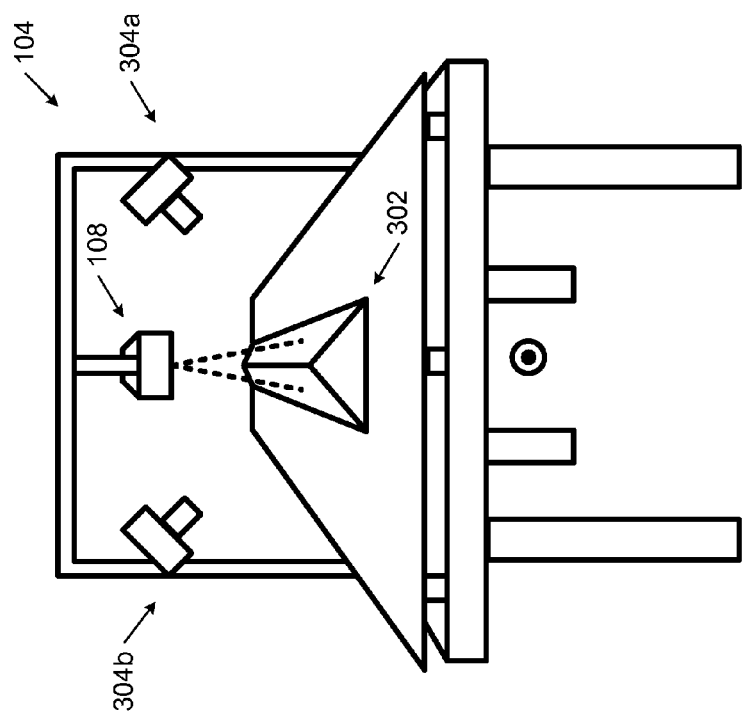
FIG. 3 depicts a web printing device that utilizes a folding board, according to embodiments disclosed herein.

FIG. 3 depicts a web printing device 104 that utilizes a folding board 302, according to embodiments disclosed herein. As illustrated, the web printing device 104 may include the printer 108, a folding board 302, and at least one vision device, such as vision devices 304a, 304b. The web of material 106 (shown in FIGS. 1 and 2) may be placed on the folding board 302, which has a predetermined shape and alters the plane of the web of material 106 in an area that the printer 108 is printing. By altering the plane of the web of material 106, the printing width 204 is effectively increased and/or the starting web width 206 is effectively reduced. As discussed above, while reducing the starting web width 206 allows the printer 108 to print wider images, the desired image 202 may be distorted upon printing, since the printer 108 is now printing at an angle that is different than directly perpendicular to the web of material 106. Accordingly, the desired image 202 may be altered to such that the altered image substantially matches the desired image 202 that the printer 108 prints on the moving web of material 106.

Additionally, some embodiments may be configured such that the vision devices 304a, 304b determine the accuracy of an altered image that has been printed on the moving web of material 106. Specifically, the vision devices 304a, 304b may be configured to capture an image of the printed web of material 106. Logic that is part of the vision devices 304a, 304b, logic that is part of the web printing device 104, and/or logic that is part of the user computing device 102 may facilitate a comparison of the desired image and the printed image. If a determination is made that the printed image on the moving web of material 106 substantially matches the desired image 202, the moving web of material 106 may continue printing. If a determination is made that the altered image does not substantially match the desired image 202, a user may be notified and/or the altered image may again be altered to achieve a more accurate print.

FIG. 4 depicts a cross-sectional view of a folding board 406 and a web of material 106, according to embodiments disclosed herein. As illustrated, the folding board 302 may alter a plane of the moving web of material 106 to effectively reduce the starting web width 206. While the folding board 302 may define a geometric alteration, depending on the type of material and/or other characteristics of the moving web of material 106 (such as thickness, elasticity, pliability, etc.), the web of material 106 may not completely form to the shape defined by the folding board 302. As such, when calculations are made to alter the desired image, the printed image may not meet a predetermined accuracy threshold. While the inputs and calculations described in regard to FIG. 6 may correct this deficiency, additional alterations may be made to achieve the desired image 202 after viewing the printed image. If such alterations are made, the user computing device 102 may store data related to the new alterations to more accurately calculate image alterations in the future.

It should be noted that while a triangular folding board may be utilized, this is merely an example. Other shapes, such as circular, curved, inverted, etc. may be used. Additionally, the folding board may simply cause the web of material 106 to tilt relative to the printer 108 (or the printer 108 tilts relative to the web of material 106. Additionally, while the printer 108 is depicted has having a printing width 204 that resides completely on the folding board, this is also an example. In some embodiments, the printing width 204 (and thus the printed image) may extend beyond the folding board 406.

FIG. 5 depicts a cross-sectional view of a dual folding board 506, utilizing a plurality of printers 108, according to embodiments disclosed herein. As illustrated, while the embodiment of FIG. 4 utilizes a triangular folding board, the embodiment of FIG. 5 utilizes the dual folding board 506 with a multi-triangular configuration. Additionally, one or more printers 108 may be utilized to print on the moving web of material 106. Depending on whether one or more printers 108 are utilized, different alterations to the desired image 202 may be made.

Figure 6:
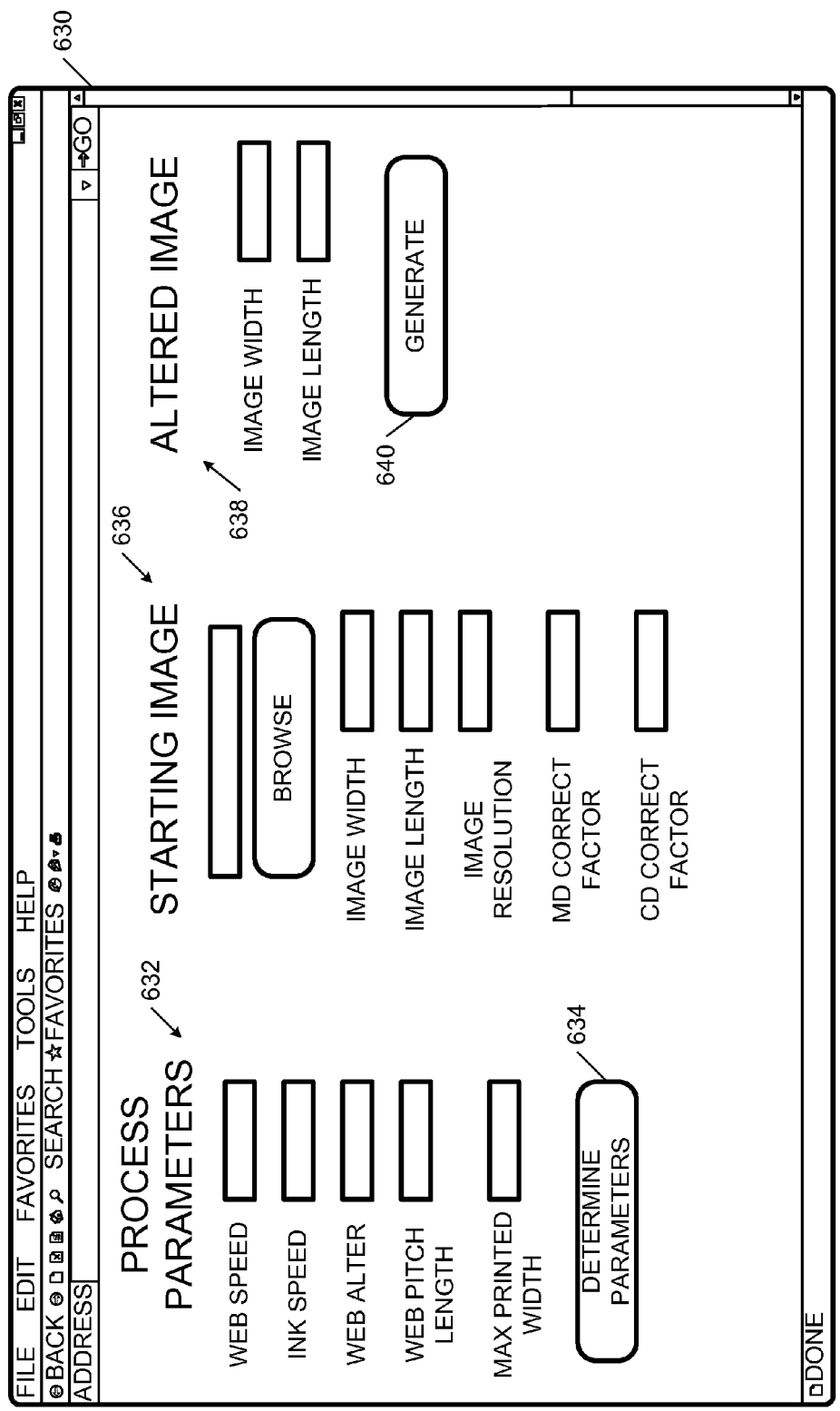
FIG. 6 depicts a user interface that may be utilized for image distortion reduction in web printing, according to embodiments disclosed herein.

FIG. 6 depicts a user interface 630 that may be utilized for image distortion reduction in web printing, according to embodiments disclosed herein. As discussed above, by utilizing folding board, the starting width of the moving web of material 106 may be effectively reduced. However, because the printer 108 is no longer printing on a flat plane, alterations to the desired image 202 may be made to achieve the desired printing results. As such, the user interface 630 may receive user input to and utilize the input data to calculate the alterations to be made to the desired image 202. The alterations may be based on a web characteristic, a printer characteristic, an ink characteristic, and/or other characteristics. As an example, web characteristic may include web speed, pliability, material used, absorbency, folding board shape, etc. The printer characteristic may include jetting frequency, print head distance, type of printer, etc. The ink characteristic may include type of ink, viscosity, ink speed, etc. Based on these characteristics, alterations may be calculated to achieve the desired image 202 printed on the web of material 106.

Specifically, the user interface 630 may include a process parameters section 632, a starting image parameters section 636, and an altered image parameters section 638. The process parameters may include web speed, ink speed, web alteration, web pitch length, and maximum printed width. The web speed refers to the speed that the web of material travels during the printing process. The ink speed refers to the speed that the ink travels from the printer head to the web of material 106. The web alteration parameter refers to the alteration to the web of material 106 that the folding board 302 creates. If the folding board 302 from FIG. 3 is utilized, the web alteration parameter may be defined as an angle of the folding board 302, relative to a perpendicular. If the folding board 302 is rounded, parabolic, or other shape, an equation and/or value may be used for the web alteration parameter. The web pitch length may refer to the length that the web of material as moved per amount of product (in the machine direction). The maximum printed width may refer to a width of the image that will be printed. Also included is a determine parameters option 634. Specifically, while the user may input the process parameters described above, some embodiments may be configured to automatically determine one or more of the parameters. As an example, the web printing device 104 may determine and communicate the process parameters to the user computing device 102. The process parameters may be stored in a memory component of the web printing device 104 and/or the web printing device 104 may include one or more sensors to determine the parameters. As such, in response to selection of the determine parameters option 634, the user computing device 102 may determine the parameters.

Additionally, the starting image parameters section 636 may include an option for the user to determine and/or upload the starting image (desired image). From the starting image an image width, an image length, and an image resolution may be determined (and/or input by the user). The machine direction (MD) correction factor may be input by the user and/or determined by the user computing device 102. Similarly, a cross-machine direction (CD) correction factor may be input and/or determined. The MD correction factor may compensate for variations in web of material 106 or other parameter that affects printing in the machine direction. The CD correction factor may compensate for variations that occur in the cross-machine direction (perpendicular to the MD).

The altered image parameters section 638 may include an image width field and an image length field. The image width and image length may be determined based on the other parameters described above and represent the size of the image that will be sent to the printer 108. Based on the effect that the folding board 302 has on the web of material 106, by printing the altered image, the desired image 202 will result. Accordingly, the user interface 630 also includes a generate option 640. In response to selection of the generate option 640, the altered image may be generated. The altered image is generated by determining a deformation factors (including a machine direction deformation factor and/or a cross-machine direction deformation factor), which includes a pixel-by-pixel calculation of offset that will be made based on the effect of the folding board 302. Specifically, a first number of pixels may be determined in the desired image 202. From this information, a second number of pixels may be calculated in the altered image. Based on the position on the image and a position on the folding board 302, each pixel may have a different offset between the desired image 202 and the altered image. In some embodiments the offset may be the same or similar for at least a portion of the pixels.

It should also be understood that the user computing device 102 may also detect a speed change in the web travel speed. The user computing device 102 may then alert a user of the change and/or recalculate the deformation factor (including a machine direction deformation factor and/or a cross-machine direction deformation factor) to further alter the altered image, based on the new web travel speed. Similarly, the user computing device 102 may receive information related to other changes to the web of material 106, the printer 108, and/or the ink and further alter the altered image, such that the desired image 202 results.

Figure 7:
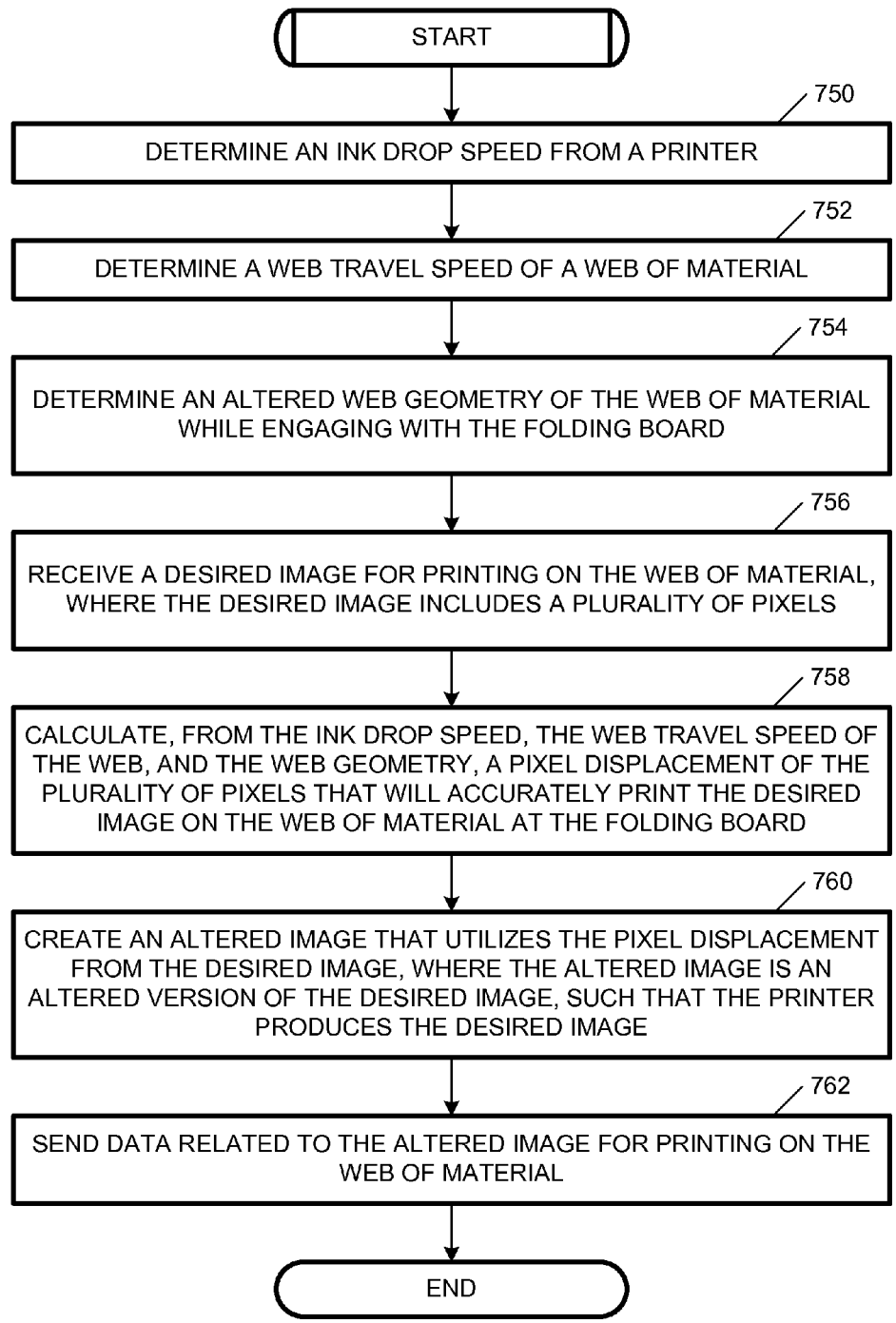
FIG. 7 depicts a flowchart for image distortion reduction in web printing, according to embodiments disclosed herein.

FIG. 7 depicts a flowchart for image distortion reduction in web printing, according to embodiments disclosed herein. As illustrated in block 750, an ink drop speed of ink from the printer 108 may be determined, where the printer 108 has a printing width 204. In block 752, a web travel speed of a web of material 106 may be determined, where the web of material 106 has a web width that is greater than the printing width 204, and where the web of material 106 engages with a folding board 302 during printing that manipulates a plane of the web of material 106 such that a projection of the web width is effectively reduced. In block 754, an altered web geometry of the web of material 106 may be determined while engaging with the folding board 302, where the altered web geometry represents an amount that the folding board 302 manipulates the web of material 106. In block 756, a desired image 202 for printing on the web of material 106 may be received, where the desired image 202 includes a plurality of pixels. In block 758 a calculation may be made from the ink drop speed, the web travel speed of the web, and the altered web geometry, regarding a pixel displacement of the plurality of pixels that will accurately print the desired image 202 on the web of material 106 at the folding board 302. In block 760, an altered image may be created that utilizes the pixel displacement from the desired image 202, where the altered image is an altered version of the desired image 202 such that the printer 108 produces the desired image 202. In block 762, data related to the altered image may be sent for printing on the web of material 106.

FIG. 8 depicts a user computing device 102 that may be utilized for image distortion reduction in web printing, according to embodiments disclosed herein. In the illustrated embodiment, the user computing device 102 includes a processor 830, input/output hardware 832, network interface hardware 834, a data storage component 836 (which stores device data 838a and image data 838b), and the memory component 140. The memory component 140 includes hardware and may be configured as volatile and/or nonvolatile memory and, as such, may include random access memory (including SRAM, DRAM, and/or other types of RAM), flash memory, registers, compact discs (CD), digital versatile discs (DVD), and/or other types of non-transitory computer-readable mediums. Depending on the particular embodiment, the non-transitory computer-readable medium may reside within the user computing device 102 and/or external to the user computing device 102.

Additionally, the memory component 140 may be configured to store operating logic 842, the data gathering logic 144a, and the printing calculation logic 144b, each of which may be embodied as a computer program, firmware, and/or hardware, as an example. A local communications interface 846 is also included in FIG. 8 and may be implemented as a bus or other interface to facilitate communication among the components of the user computing device 102.

The processor 830 may include any hardware processing component operable to receive and execute instructions (such as from the data storage component 836 and/or memory component 140). The input/output hardware 832 may include and/or be configured to interface with a monitor, keyboard, mouse, printer, camera, microphone, speaker, and/or other device for receiving, sending, and/or presenting data. The network interface hardware 834 may include and/or be configured for communicating with any wired or wireless networking hardware, a satellite, an antenna, a modem, LAN port, wireless fidelity (Wi-Fi) card, WiMax card, mobile communications hardware, and/or other hardware for communicating with other networks and/or devices. From this connection, communication may be facilitated between the user computing device 102 and other computing devices.

Similarly, it should be understood that the data storage component 836 may reside local to and/or remote from the user computing device 102 and may be configured to store one or more pieces of data for access by the user computing device 102 and/or other components. In some embodiments, the data storage component 836 may be located remotely from the user computing device 102 and thus accessible via the network 100. In some embodiments however, the data storage component 836 may merely be a peripheral device, but external to the user computing device 102.

Included in the memory component 140 are the operating logic 842, the data gathering logic 144a, and the printing calculation logic 144b. The operating logic 842 may include an operating system and/or other software for managing components of the user computing device 102. Similarly, the data gathering logic 144a may be configured to cause the user computing device 102 to determine one or parameters related to the web of material 106, the printer 108, and/or the ink (such as those described in FIG. 6). The printing calculation logic 144b may cause the user computing device 102 to calculate alterations to a desired image to accurately print on the web of material 106 at the folding board 302.

It should be understood that the components illustrated in FIG. 8 are merely exemplary and are not intended to limit the scope of this disclosure. While the components in FIG. 8 are illustrated as residing within the user computing device 102, this is merely an example. In some embodiments, one or more of the components may reside external to the user computing device 102.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be understood to those skilled in the art that various other changes and modifications can be made without departing from the spirit and scope of the invention. It is therefore intended to cover in the appended claims all such changes and modifications that are within the scope of this invention.

What is claimed is:

1. A system for image distortion reduction in web printing, comprising:
    a folding board of a predetermined shape consisting of a dual folding board with a multi-triangular configuration equivalent to an upside down w that defines an altered web geometry and receives a moving web of material with a starting web width such that when the folding board receives a printing area of the moving web of material, a plane of the moving web of material is manipulated such that a projection of the starting web width is effectively reduced by to create an altered geometry, wherein the moving web of material moves at a web travel speed in a machine direction, and wherein after the printing area of moving web of material passes the folding board, the starting web width is restored;
    a printer that prints on the moving web of material at the printing area where the folding board receives the printing area by dispensing ink drops onto the moving web of material at an ink drop speed, wherein the printer prints at a printing width that is less than a width of the altered geometry; and
    a computing device comprising a processor and a memory component, wherein the memory component stores logic that, when executed by the processor, causes the system to perform at least the following:
    determine the ink drop speed, the web travel speed, and the altered web geometry;
    receive a desired image for printing on the moving web of material at the printing area, wherein the desired image includes a pixel;
    calculate, from the ink drop speed, the web travel speed, and the altered web geometry, a pixel displacement of the pixel in a cross-machine direction that will accurately print the desired image in the printing area while the folding board is receiving the printing area;

create an altered image that utilizes the pixel displacement from the desired image; and send data related to the altered image to the printer for printing.

2. The system of claim 1, wherein calculating the pixel displacement further utilizes at least one of the following: a characteristic of the ink, a characteristic of the moving web of material, and a characteristic of the printer.

3. The system of claim 1, further comprising a vision device that captures the altered image, wherein the logic further causes the system to perform at least the following:

determine whether the altered image on the moving web of material substantially matches the desired image after the moving web of material at the printing area is moved from the folding board; and in response to determining that the altered image on the moving web of material does not substantially match the desired image, recalculate the pixel displacement.

4. The system of claim 1, wherein the logic further causes the system to perform at least the following:

detect a speed change in the web travel speed; and further alter the altered image, based on the speed change.

5. The system of claim 1, wherein the logic further causes the system to utilize a deformation factor to calculate the pixel displacement.

6. The system of claim 1, wherein the pixel displacement additionally occurs in the machine direction, wherein the machine direction is substantially perpendicular to the cross-machine direction.

7. The system of claim 1, wherein the logic further causes the system to perform at least the following:

determine a first number of pixels in the desired image; and calculate a second number of pixels in the altered image.

* * * * *